(No Model.)
W. HENSON.
BARBED WIRE STRETCHER.
No. 262,768. Patented Aug. 15, 1882.
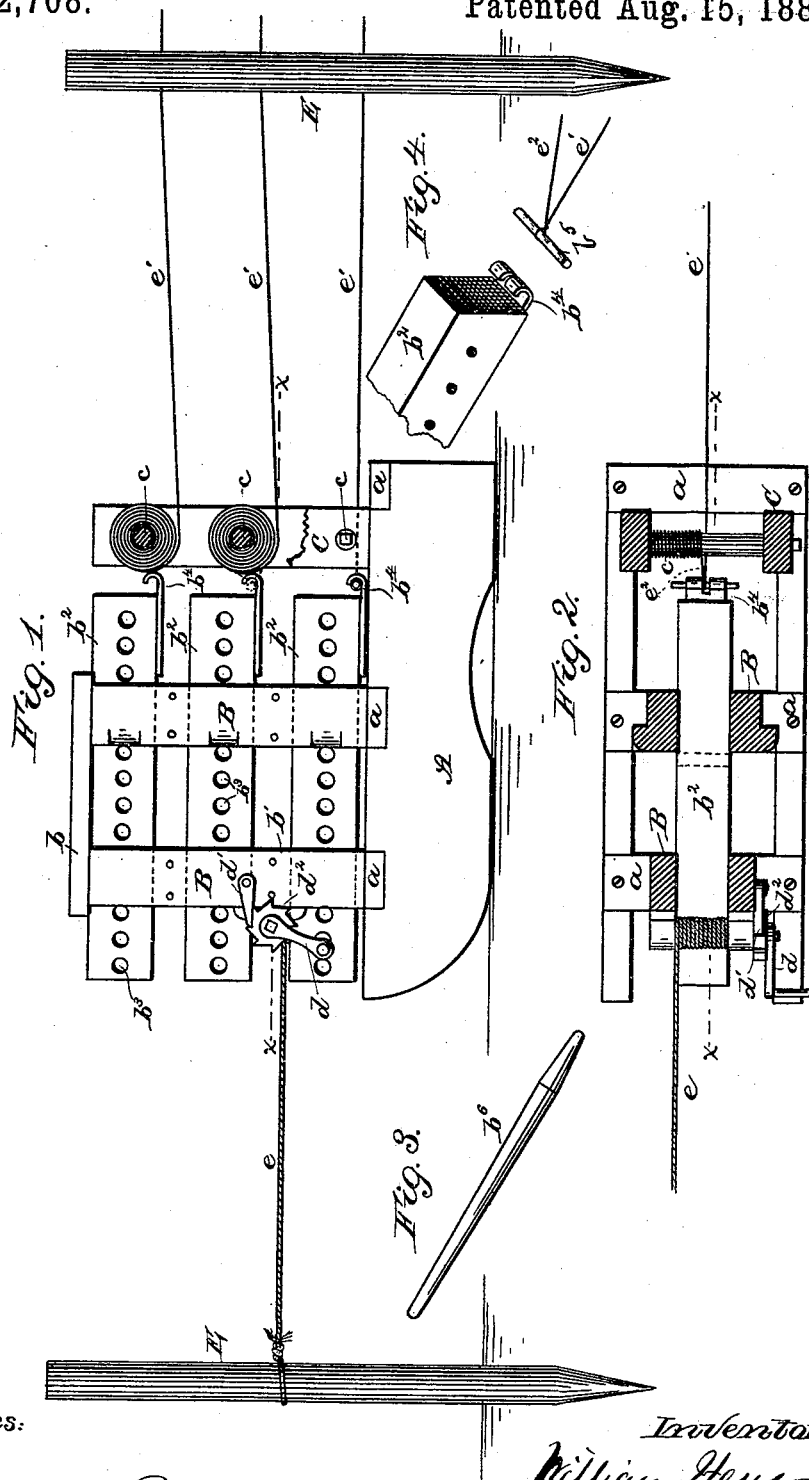

United States Patent Office.

WILLIAM HENSON, OF HALLSVILLE, MISSOURI.

BARBED-WIRE STRETCHER.

SPECIFICATION forming part of Letters Patent No. 262,768, dated August 15, 1882.

Application filed July 6, 1882. (No model.)

*To all whom it may concern:*

Be it known that I, WILLIAM HENSON, a citizen of the United States, residing at Hallsville, in the county of Boone and State of Missouri, have invented certain new and useful Improvements in Barbed-Wire Stretchers, of which the following is a specification, reference being had therein to the accompanying drawings.

My invention relates to wire-fence stretchers; and it consists in the construction and arrangement of its several parts, as will be hereinafter fully set forth, and pointed out in the claims.

In the drawings, Figure 1 is a side elevation, and Fig. 2 a horizontal section upon the line $xx$, Fig. 1. Fig. 3 is a view of the lever used to draw the bars forward, and Fig. 4 is a view of the hook end of the bar and of the means of securing the wire thereto.

A represents runners joined parallel to each other by braces $a\ a\ a$, as shown. Firmly secured to the top of these braces are parallel vertical standards B, and to the rear of them is arranged the wire-roller frame C, as shown. The uprights B are secured together and braced at their tops by the cross-piece $b$. Placed between the uprights at suitable distances are blocks $b'$, (shown in dotted lines, Fig. 1,) and sliding in the spaces between the blocks are stretcher-bars $b^2$. These bars have a series of holes, $b^3$, arranged along their central line, and to their rear ends are hooks $b^4$, to which the fence-wires are attached, as shown.

D is a windlass. It is journaled to the forward upright, B, on a line with one of the blocks $b'$, preferably the lower one, so that the projecting ends of the bars $b^2$ pass above and below it, as shown. It is provided with a suitable crank, $d$, and a pawl, $d'$, and ratchet $d^2$, and is adapted to receive the draft-rope $e$.

The wire-roller frame C has rollers $c$ arranged horizontally across it, upon which the fence-wire $e'$ is rolled. E are the fence-posts.

In the operation of the device the different wires upon the rollers $c$ are attached to a post, and the draft-rope $e$ is secured to a post some distance in advance. The windlass D is then turned and the rope wound upon it, thus drawing the device along and unrolling the wire upon the rollers $c$. When a sufficient length of wire has been unrolled each strand is caught around the pin $b^5$, as shown in Fig. 4, and the pin is then caught behind the prongs of the hook $b^4$ of the adjacent bar $b^2$, the wire strands extending through the space between the prongs, as shown in Fig. 2. In Figs. 2 and 4 $e^2$ represents the strand of wire connected with the coil, and $e'$ the fence-wire. In order to prevent the bars from slipping back, the end of the lever $b^6$ is then inserted into the hole $b^3$ nearest the upright B, and by it the bar is wedged forward until sufficient tension has been secured upon the wires $e'$. The wires may then be secured to the next post in the rear of the machine, the draft-rope unwound from the windlass, carried forward to another post, and the operation previously described repeated.

What I claim is—

1. A wire-fence stretcher consisting of the runners A, secured by braces $a\ a$, the vertical standards B, windlass D, and horizontal stretcher-bars $b^2$, provided with a series of holes, $b^3$, into which is inserted the lever $b^6$, and having hooks upon their rear ends adapted to hold the wires while being stretched, substantially as shown and described.

2. A wire-fence stretcher consisting of the runners A, secured by braces $a\ a$, provided with vertical standards B, windlass D, and horizontal stretcher-bars $b^2$, provided with a series of the holes $b^3$, into which is inserted the lever $b^6$, and having a vertical wire-roller frame, C, arranged upon its rear portion, and provided with rollers $c$, adapted to receive the rolls of fence-wire, substantially as shown and described.

3. A wire-fence stretcher consisting of the runners A, secured by braces $a$, the vertical standards B, stretcher-bars $b^2$, provided with holes $b^3$, adapted to receive the lever $b^6$, hooks $b^4$, and pins $b^5$, and provided with a windlass, D, adapted to receive the draft-rope $e$, substantially as shown and described.

In testimony whereof I hereby affix my signature in presence of two witnesses.

WILLIAM HENSON.

Witnesses:
 W. T. SUMMERS,
 A. H. JONES.